July 31, 1923.
L. J. GENETT
1,463,465
DEMOUNTABLE RIM STAND
Filed April 12, 1920     3 Sheets-Sheet 3
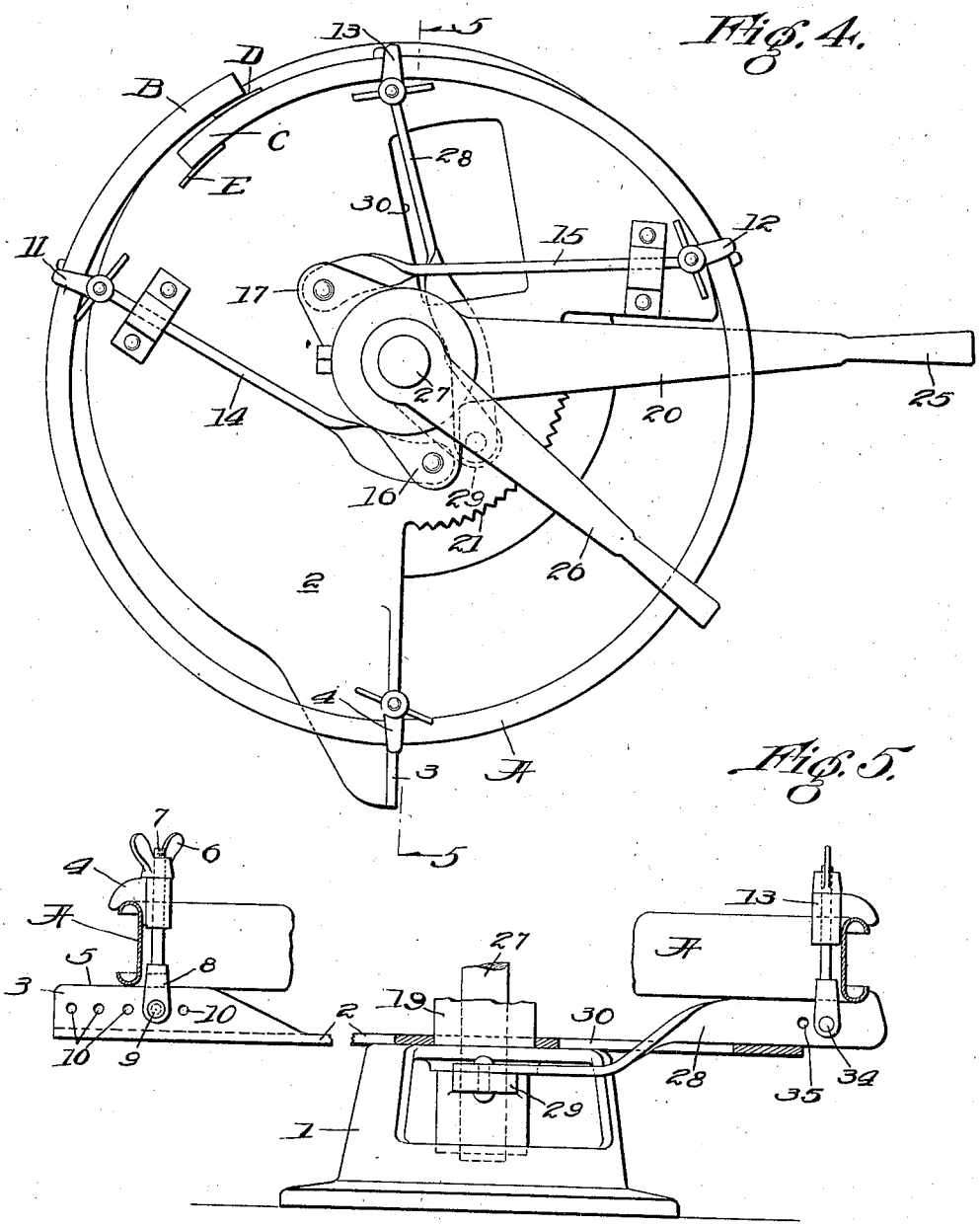
WITNESSES:
INVENTOR
Louis J. Genett
BY
ATTORNEY Patented July 31, 1923.

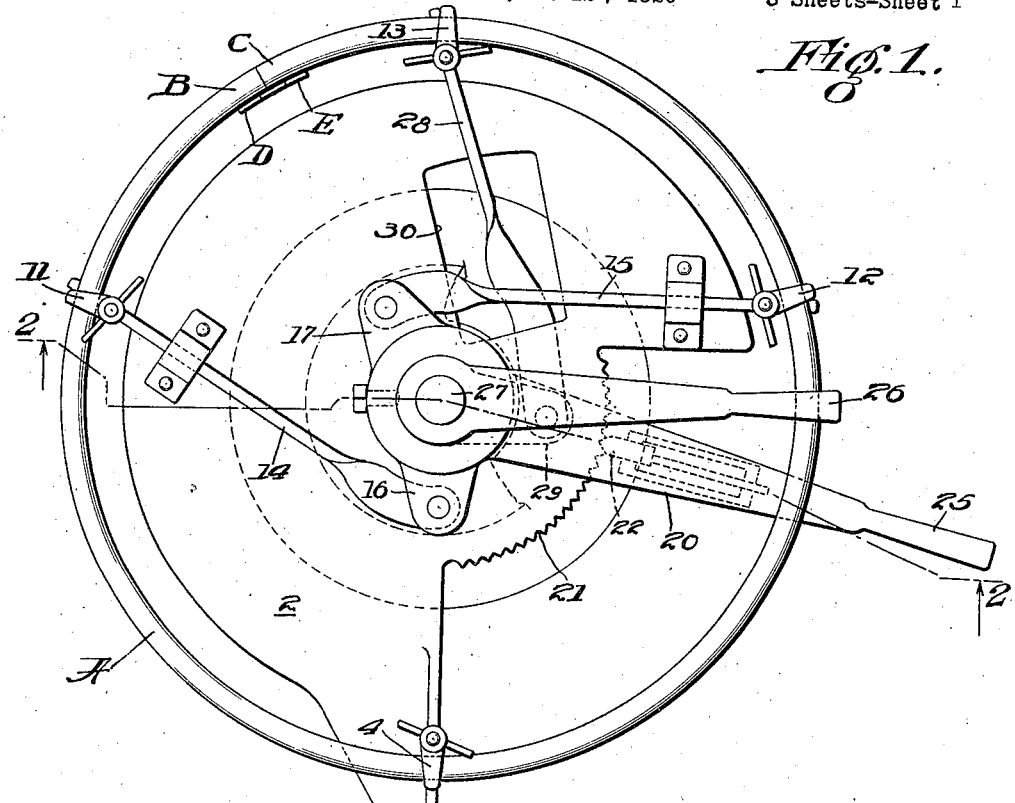

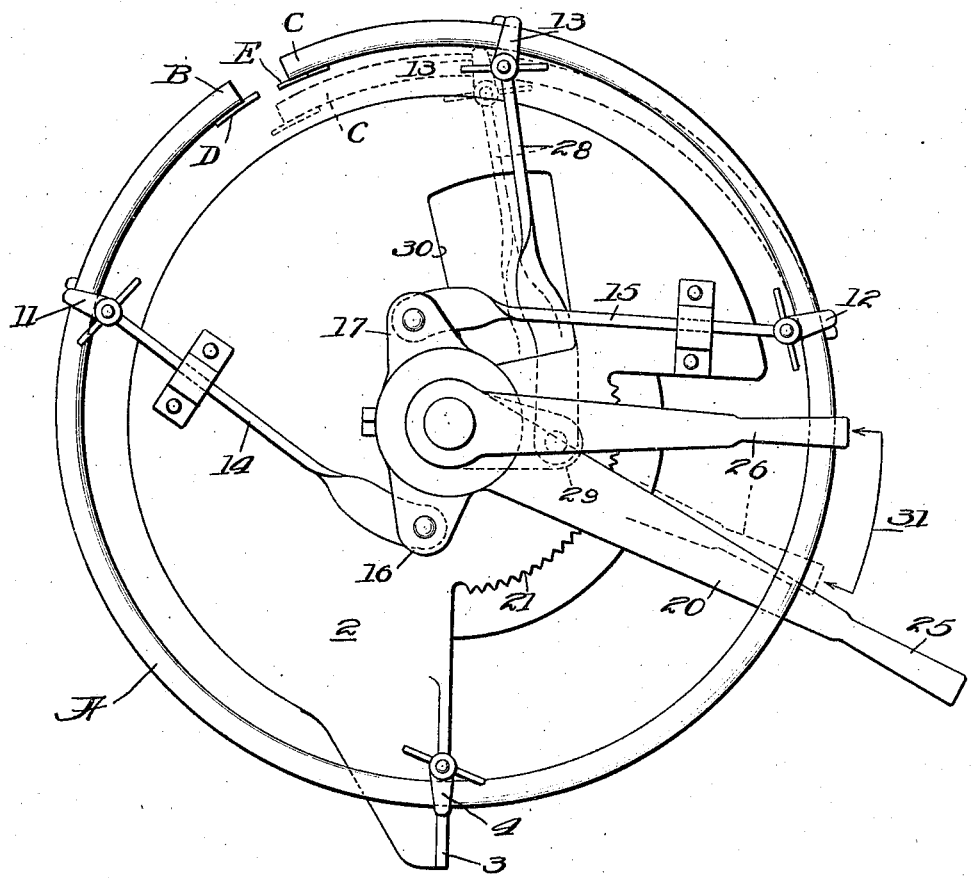

1,463,465

UNITED STATES PATENT OFFICE.

LOUIS J. GENETT, OF MARQUETTE, MICHIGAN, ASSIGNOR OF ONE-HALF TO JOHN M. LONGYEAR, JR., OF MARQUETTE, MICHIGAN.

DEMOUNTABLE-RIM STAND.

Application filed April 12, 1920. Serial No. 373,182.

*To all whom it may concern:*

Be it known that I, LOUIS J. GENETT, a citizen of the United States, residing at Marquette, in the county of Marquette and the State of Michigan, have invented certain new and useful Improvements in Demountable-Rim Stands, of which the following is a specification, reference being had to the accompanying drawings, forming a part thereof.

The purpose of this invention is to provide means to facilitate the removal of automobile tires from demountable wheel rims, and their replacement thereon. It consists in the features and elements of construction described and shown in the drawings, as indicated by the claim.

In the drawings:

Figure 1 is a top plan view of a device embodying this invention and a demountable rim in position thereon ready for manipulation for application or removal of the tire.

Figure 2 is a transverse section, taken as indicated at line 2—2, on Figure 1.

Figure 3 is a plan view taken similarly to Figure 1, but showing the parts in position for expanding the rim to separate its interlocked ends as shown in the drawing.

Figure 4 is a view taken similarly to Figure 3, but showing the parts contracting the rim and overlapping one end upon the other at the joints for reducing its diameter to facilitate removal or application of the tire.

Figure 5 is a fragmental sectional view taken as indicated at line 5—5, on Figure 4, to disclose certain features of construction.

The usual form of demountable rim for carrying an automobile tire is a circular flanged or grooved band cut through at one point making it a split ring, and provided at this point with interlocking features for making a butt joint of the cut ends of the band, secure against lateral displacement. The drawings show such a tire-carrying rim, A, whose end portions, B and C, form a butt joint and are fitted with interlocking plates or cleats, D and E, respectively, which are mutually engaged, as indicated in Figure 2, when the rim is in its normal circular form. Since the tire is dimensioned to fit snugly around the rim when ends, B and C, are connected in the position shown in Figure 1, it is a matter of some difficulty to separate these ends sufficiently for disengaging the interlapped cleats, D and E, which is necessary before the rim can be contracted enough to permit removal of the tire. The present invention is arranged to support the rim and tire during this operation and to provide such mechanical advantage for the expansion the manipulation of the rim, as will render the removal of the tire comparatively easy and rapid.

The device comprises a base, 1, supporting a plate or disk, 2, having an up-standing rib or flange, 3, which is fitted with a clamp, 4, designed to engage the rim, A, at a point approximately opposite the joined ends, B and C, said clamp including the upper edge, 5, of the flange or rib, 3, and the movable jaw member, 4, held in position by a wing nut, 6, on a threaded stem or bolt, 7, having a bifurcated head or terminal, 8, with a bolt or pin, 9, extending through one of the holes, 10, in the rib or flange, 3,—a series of such holes being provided to accommodate the device to various sizes of rim.

When the rim, A, has been secured by the clamp, 4, it is engaged by additional clamps, 11, 12 and 13, the clamps, 11 and 12, taking hold of the rim at opposite sides of its joint, and the clamp, 13, engaging it adjacent the joint and between the other two. The clamps, 11 and 12, are connected by links, 14 and 15, respectively, with oppositely extending arms, 16 and 17, of a sleeve or hub, 18, which is rotatably mounted on the upstanding hollow post, 19, of the base, 1, and provided with the radially-extending handle, 20, by which it may be rotated upon said post, 19, through a limited angle. The base plate, 2, is formed with a toothed segment, 21, concentric with respect to the axis of the post, 19, and the handle, 20, is provided with a locking dog, 22, yieldingly held in engagement with said toothed segment by means of a spring, 23, adapted to be withdrawn and released therefrom by a handle, 24, pivoted adjacent the main handle, 25, of the lever, 20. The dog, 22, being thus released, the lever, 20, is swung in a direction for thrusting the links, 14 and 15, outwardly to expand the rim to the position shown in full line in Figure 3, thus separating its end portions, B and C, and the interlocked plates, D and E, thereon. A second hand lever, 26, fulcrumed on the base by means of a shaft, 27, journaled within the hollow post, 19, is then rocked in a direction for pulling inwardly upon the end portion, C, by means of the link, 28, connected to the clamp, 13, at one end and to the arm, 29, which extends from the shaft, 27, at its lower end within the base, 1, of the device. As shown in Figure 1, the link, 28, is twisted and bent upwardly to pass through a clearance aperture, 30, which is formed in the plate, 2, for accommodating it.

Such movement of the lever, 26, through the arc, 31, as indicated in Figure 3, brings the lever to the position shown in dotted lines thereon and thus moves the end portion, C, of the rim to the dotted line position shown in said Figure 3, by which it is moved out of alignment with the end portion, B, preparatory to contracting sufficiently to release it from a tire or to permit the easy replacement of the tire thereon. The final step in the operation consists in now contracting the rim by a movement of the lever, 20, in a direction opposite to its initial movement, pulling inwardly upon its connected links, 14 and 15, thus drawing the opposite sides of the rim toward each other and forcing the end portions, B and C, to overlap each other as shown in Figure 4. The rim is held in this position by engagement of the dog with a tooth of the segment, 21, and while the parts are thus held, a tire may be slipped off from the rim or replaced thereon. In the latter case the lever, 20, is then swung back to the position in which it is shown in Figure 3, the lever, 26, is then moved from its dotted line position to its full line position shown in that figure, and finally the lever, 20, is returned to its position illustrated in Figure 1, in which it draws together the aligned ends, B and C, of the rim, A, for normal interlocking engagement of the plates, D and E.

As shown, each of the operating links, 14, 15 and 28, is provided with clamp devices, 11, 12 and 13, which are quite similar in construction to the clamps, 4, provided for securing the portion of the rim opposite the joints. By reason of the hooked formation of the clamping members, and the pull or push of the links to which they are attached being almost directly against these hooks, it is not necessary that the clamps be secured very tightly. Thus by providing a wing nut for them, they can be adjusted or removed very quickly and the entire operation of applying or removing a tire to a rim of this type can be accomplished in a few seconds. As suggested in Figure 2, the base, 1, may be mounted for vertical extension of the base plate, 2, and supported upon a post shown in dotted lines at 32, with a base, 33, or, if preferred, the post and base may be omitted and the base castings, 1, may be mounted upon a vertical wall, so that the rim and tire will be positioned in a vertical plane during the operation; in either case the mode of use of the device is the same.

As suggested in Figure 2, each of the clamping bolts, provided for clamps, 11, 12 and 13, may be formed with a yoke similar to the yoke, 8, of the bolt, 7, to permit adjustable attachment of the clamp to its link by means of a bolt or pin, 34, engaging one of a plurality of holes, 35, in the link for accommodating the device to different sizes of rim.

I claim:

A rim adjusting device comprising a support, rim securing means fixed thereon, an adjusting member rotatably fulcrumed on the support, a pair of links eccentrically pivoted to said member at opposite sides of its axis and terminating in pivotally attached clamps adapted to engage the rim at opposite sides of a separable joint, together with a deforming device fulcrumed on said support coaxially with the adjusting member and including a pivoted link terminating in a pivotally attached clamp positioned to engage the rim near its separable joint, said link being a rigid member adapted for moving the end portion of the rim inwardly or outwardly.

In testimony whereof I have hereunto set my hand at Chicago, Illinois, this 30th day of March, 1920.

LOUIS J. GENETT.